UNITED STATES PATENT OFFICE.

NATHANIEL THURLOW, OF NEWARK, NEW JERSEY, ASSIGNOR, BY MESNE ASSIGNMENTS, TO THE PORTCHESTER CHEMICAL COMPANY, A CORPORATION OF NEW YORK.

PROCESS OF PRODUCING CAMPHOR.

SPECIFICATION forming part of Letters Patent No. 698,761, dated April 29, 1902.

Application filed August 6, 1901. Serial No. 26,036. (Specimens.)

*To all whom it may concern:*

Be it known that I, NATHANIEL THURLOW, a citizen of the United States, residing at Newark, Essex county, New Jersey, have invented certain new and useful Improvements in Processes for the Production of Camphor and a By-Product of Such Process, of which the following is a specification.

This invention relates to improvements in processes for the production of camphor.

The process is based on the action on turpentine of a substance—namely, oxalic acid—capable of supplying the carboxyl group COOH, forming ethereal salts, which by oxidation processes may be converted into camphor.

The process is carried out as follows: Five (5) parts, by weight, of anhydrous turpentine are mixed with one part, by weight, of anhydrous oxalic acid and the mixture heated in a suitable vessel to a temperature below the boiling-point of turpentine, (say, 120° centigrade to 130° centigrade,) when a reaction sets in between the turpentine and the oxalic acid. The resulting product is found to be a mixture of borneol, borneol oxylate, borneol formate, camphor, and waste polymerization products. This mixture is treated with caustic alkalies, such as lime, in excess to break up the ethereal salts of borneol resulting in a mixture of camphor and borneol with certain impurities. This product is distilled with steam to separate the borneol and camphor from the impurities. This results in a purified mixture of pinyl formate, pinyl oxalate, borneol, and camphor, with some oily matter, from which the borneol and the camphor are separated by any usual process of freezing and centrifugaling or filtering and washing, which is then oxidized to convert the borneol into camphor, the camphor being then separated from the oxidizing agent and purified in the usual manner.

I may use for the oxidizing agent potassium dichromate with sulfuric acid.

The reactions are assumed to take place according to the following structural equations:

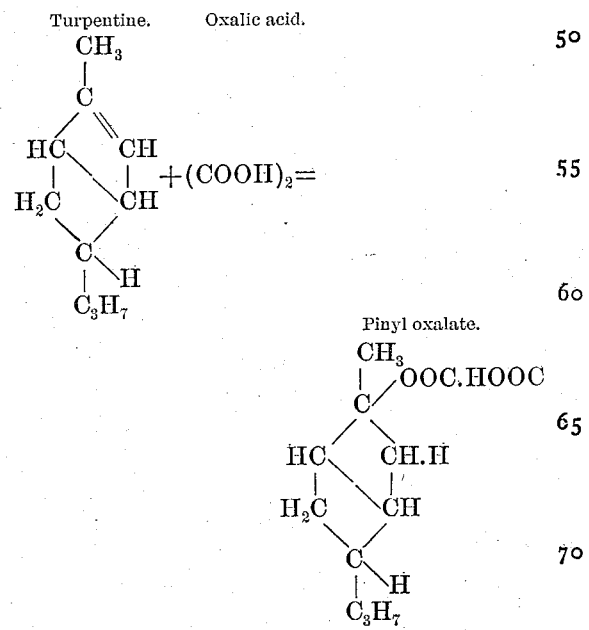

The pinyl oxalate then loses water and carbon monoxid and forms camphor, as follows:

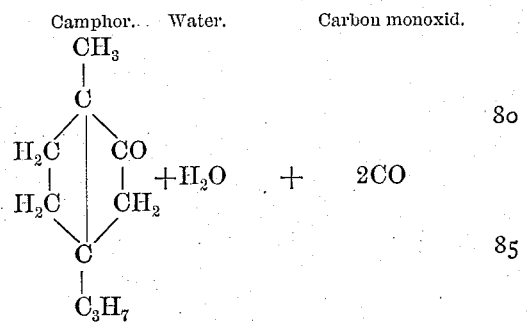

Owing to the decomposition of oxalic acid resulting in the formation of formic acid, $(2(COOH) = HCOOH + CO_2)$ pinyl formate is formed, as follows:

Turpentine.           Pinyl formate.

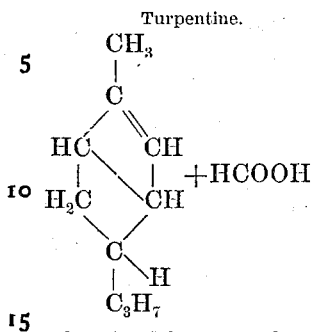 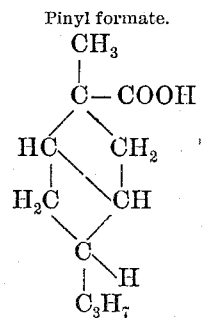

The pinyl formate then loses carbon monoxid, producing borneol, as follows:

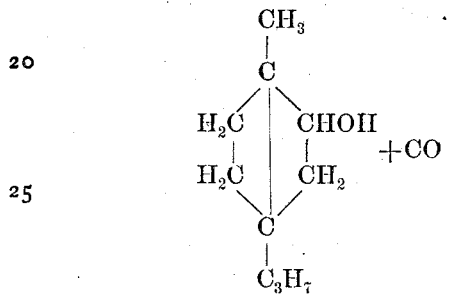

The borneol is then oxidized to camphor, as per the following equation:

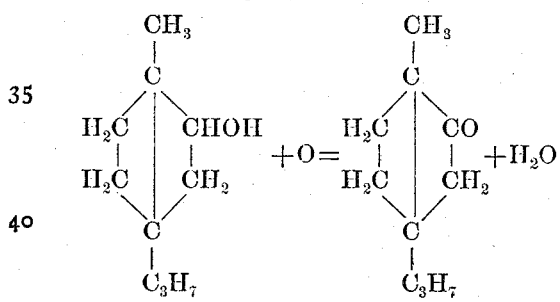

The process may be carried out in any suitable system of stills and condensing apparatus, such as are used in similar processes in the arts.

For the turpentine used in the above-described process I may employ any of the well-known varieties of turpentine containing pinene—namely, the so-called English (American) oil of turpentine, distilled in America from *Pinus Australis* and consisting largely of dextro pinene, French oil of turpentine, distilled in France from *Pinus maratima*, or any other product containing sufficient pinene, either lævo or dextro, to be suitable for the process.

Pinyl formate is a colorless oil, whose boiling-point at six hundred and eighty millimeters vacuum is 160° to 163° centigrade, but rises rapidly owing to decomposition. It does not solidify at −17° centigrade—specific gravity at 20° centigrade equals .933—decomposes on heating into borneol and carbon monoxid, decomposes on boiling with water into formic acid and different hydrocarbons, among which there appears to be camphene (boiling-point 160° to 162° centigrade,) and is decomposed rapidly by alcoholic or aqueous solution of caustic alkali into hydrocarbons and a formate.

The product pinyl oxalate above referred to is not claimed herein, but is claimed in and forms part of a divisional application, Serial No. 85,425, filed December 11, 1901.

Having thus described my invention, what I claim as new therein, and desire to secure by Letters Patent, is—

1. The process of producing camphor, which consists in acting on turpentine with oxalic acid at a suitable temperature.

2. The process of producing camphor, which consists in heating anhydrous turpentine with anhydrous oxalic acid.

3. The process of producing camphor, which consists in acting on turpentine with oxalic acid, producing borneol and camphor, and then oxidizing the borneol to convert it into camphor.

4. The process of producing camphor, which consists in acting on turpentine with oxalic acid, acting on the resulting mixture with lime, and distilling to separate the borneol and camphor, and oxidizing the borneol to convert it into camphor.

5. The compound, pinyl formate, resulting from the action of oxalic acid on turpentine, and having the following structural formula:

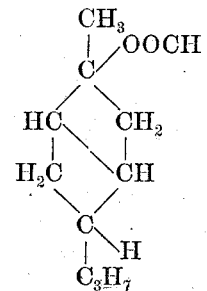

said compound having a boiling-point at six hundred and eighty millimeters vacuum, of 160° to 163° centigrade, solidifying below −17° centigrade — decomposed on heating into borneol and carbon monoxid, and decomposed on heating with caustic alkali solution into hydrocarbons and a formate.

NATHANIEL THURLOW.

Witnesses:
ARTHUR P. KNIGHT,
J. GREEN.

Correction in Letters Patent No. 698,761.

It is hereby certified that in Letters Patent No. 698,761, granted April 29, 1902, upon the application of Nathaniel Thurlow, of Newark, N. J., for an improvement in "Processes of Producing Camphor," an error appears in the printed specification requiring correction, as follows: On page 1, line 35, the words and commas "pinyl formate, pinyl oxalate," should be stricken out and inserted after the word "of," line 26, same page; and that the said Letters Patent should be read with this correction therein that the same may conform to the record of the case in the Patent Office.

Signed and sealed this 10th day of June, A. D., 1902.

[SEAL.]

F. I. ALLEN,
*Commissioner of Patents.*